United States Patent
Choudhuri et al.

(10) Patent No.: US 9,280,774 B1
(45) Date of Patent: Mar. 8, 2016

(54) SYSTEM AND METHOD FOR INVESTIGATING FRAUDULENT ACTIVITY

(71) Applicant: Bank of America Corporation, Charlotte, NC (US)

(72) Inventors: Somnath Choudhuri, Newark, DE (US); Adam D. Goldberg, Plainview, NY (US); Matthew Hansen, River Forest, IL (US); Matthew D. Hoke, Audubon, NJ (US); Oveek Mallik, Hockessin, DE (US); Joseph W. McLean, Clayton, DE (US); Kyle Sturgis, West Grove, PA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 14/481,463

(22) Filed: Sep. 9, 2014

(51) Int. Cl.
  *G07F 19/00* (2006.01)
  *G06Q 20/40* (2012.01)

(52) U.S. Cl.
  CPC .......... *G06Q 20/4016* (2013.01); *G06Q 20/409* (2013.01)

(58) Field of Classification Search
  CPC ... G06Q 20/24; G06Q 20/32; G06Q 20/3255; G06Q 20/40; G06Q 20/4016; G06Q 20/425; G06Q 30/0185; G06Q 40/00
  USPC .......................................... 235/379, 390, 492
  See application file for complete search history.

(56) References Cited

U.S. PATENT DOCUMENTS

| | | | |
|---|---|---|---|
| 7,451,113 B1* | 11/2008 | Kasower | 705/38 |
| 8,370,265 B2* | 2/2013 | Coulter et al. | 705/67 |
| 8,478,692 B2* | 7/2013 | Carlson et al. | 705/44 |
| 8,626,651 B2* | 1/2014 | Lin et al. | 705/39 |
| 8,781,963 B1* | 7/2014 | Feng et al. | 705/42 |
| 8,782,217 B1* | 7/2014 | Arone et al. | 709/224 |
| 2008/0288299 A1* | 11/2008 | Schultz | 705/4 |
| 2010/0280914 A1* | 11/2010 | Carlson | 705/26 |
| 2011/0004498 A1* | 1/2011 | Readshaw | 705/7 |
| 2013/0226720 A1* | 8/2013 | Ahluwalia et al. | 705/18 |
| 2014/0006275 A1* | 1/2014 | Hanson et al. | 705/41 |

* cited by examiner

*Primary Examiner* — Seung Lee
(74) *Attorney, Agent, or Firm* — Michael A. Springs

(57) ABSTRACT

According to one embodiment, an apparatus comprising a memory and a processor is provided. The memory is operable to store information associated with a user account. The processor can receive a message indicating that a transaction associated with a card has occurred and receive a first input indicating that the transaction is fraudulent. The processor can receive a second input indicating that a report should be filed and present, on a display, a plurality of questions to determine whether the card has been stolen. The processor can receive a third input indicating an answer to each of the plurality of questions and present, on the display, an affidavit. The processor can receive a fourth input indicating the affidavit has been electronically signed and present, on the display, a confirmation message indicating that the report has been filed.

18 Claims, 7 Drawing Sheets

SYSTEM AND METHOD FOR INVESTIGATING FRAUDULENT ACTIVITY

TECHNICAL FIELD

This disclosure relates to a system for investigating fraudulent activity.

BACKGROUND

The growth in use of credit and debit cards has been met with a rise in fraud and theft. To improve the customer experience, merchants often relax security standards during transactions. As an example, a merchant may require only a credit card number, expiration date, and security code, but not evidence of possession of the actual credit card before allowing a transaction. As a result, a user may possess the physical credit card even though information associated with the credit card has been stolen.

SUMMARY

In accordance with the present disclosure, disadvantages and problems associated with investigating fraudulent activities may be reduced or eliminated.

According to one embodiment, an apparatus comprising a memory and a processor is provided. The memory is operable to store information associated with a user account. The processor is communicatively coupled to the memory and is operable to receive a message indicating that a transaction associated with a card has occurred. In response to the message, the processor can receive a first input indicating that the transaction is fraudulent. The processor can receive a second input indicating that a report should be filed and in response to receiving the second input, present, on a display, a plurality of questions to determine whether the card has been stolen. The processor can receive a third input indicating an answer to each of the plurality of questions and in response to receiving the third input, present, on the display, an affidavit. The processor can receive a fourth input indicating the affidavit has been electronically signed and in response to receiving the fourth input, present, on the display, a confirmation message indicating that the report has been filed.

Technical advantages of certain embodiments of the present disclosure include reducing network traffic and improved fraud prevention. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION

Embodiments of the present invention and its advantages are best understood by referring to FIGS. 1 through 7, like numerals being used for like and corresponding parts of the various drawings.

The growth in use of credit and debit cards has been met with a rise in fraud and theft. To improve the customer experience, merchants often relax security standards during transactions. As an example, a merchant may require only a credit card number, expiration date and security code but not evidence of possession of the actual credit card before allowing a transaction. As a result, a user may possess the physical credit card even though information associated with the credit card has been stolen.

The described system alerts a user on a device when a potentially fraudulent transaction has occurred or is occurring. The user may then use the device to alert the appropriate institution of the fraud and to initiate a fraud claim. In this manner, the device may reduce network traffic associated with fraud alerts and fraud claims. An example embodiment of the proposed system is illustrated in FIG. 1.

Figure 1:
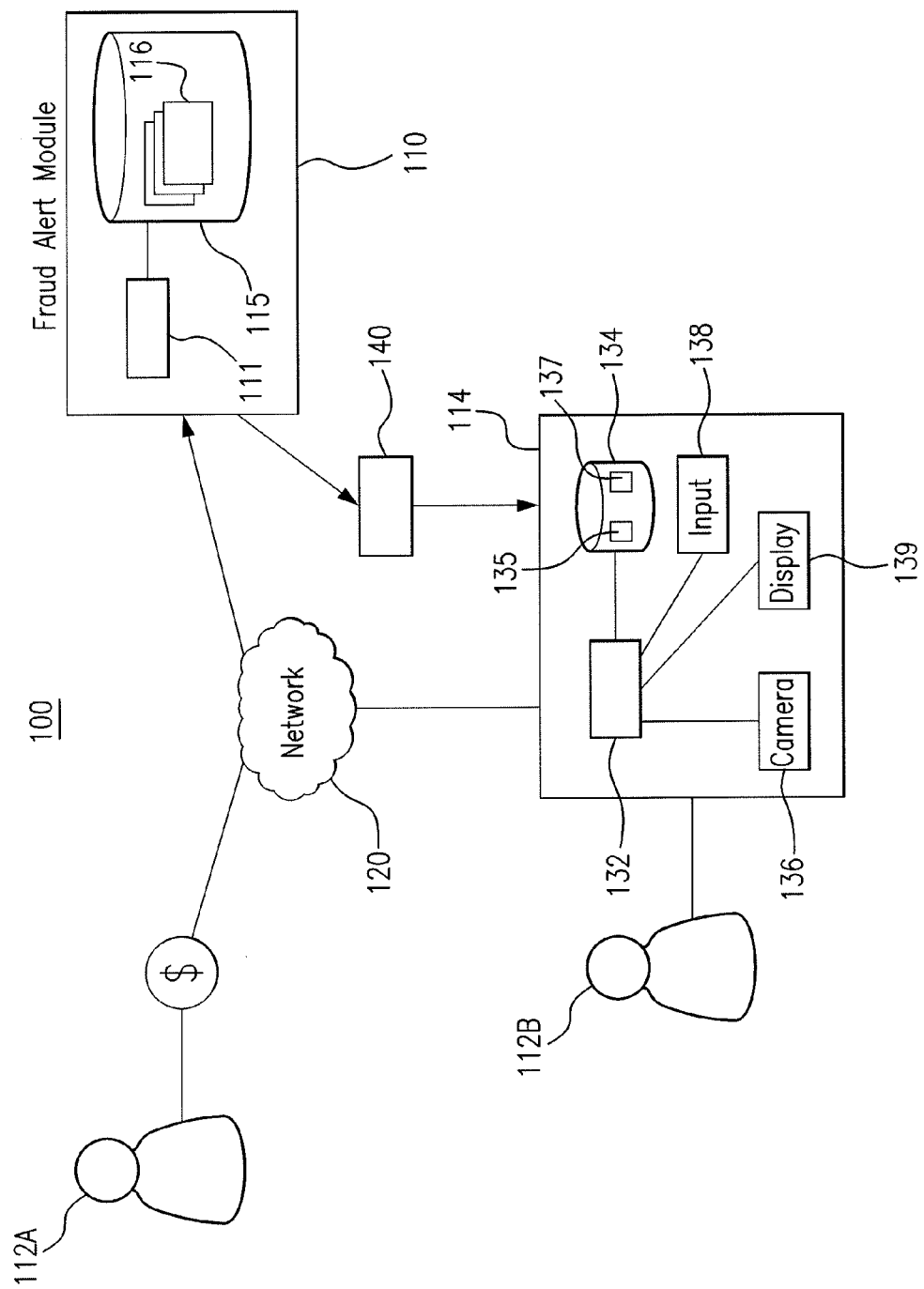
FIG. 1 is a schematic diagram of one embodiment of a system for initiating a fraud claim.

FIG. 1 is a schematic diagram of one embodiment of a system 100 for initiating a fraud claim. As illustrated in FIG. 1, system 100 includes a fraud alert module 110, device 114 and network 120. A user 112A may be performing a transaction and a user 112B may be associated with device 114. Device 114 may alert user 112B of a potentially fraudulent transaction and user 112B may use device 114 to initiate a fraud claim.

In an embodiment, user 112A may have stolen the information associated with user 112B and uses that information to perform a transaction. For example, user 112A may have stolen the credit card or debit card information of user 112B and attempts to make an online purchase using that information. In some instances, the purchase by user 112A may be approved and user 112B will be asked to pay for the purchase. In response to being asked to pay for the purchase, user 112B may use device 114 to initiate a fraud claim and/or challenge the transaction. In other instances, user 112B may be asked to verify the transaction before the purchase is approved. System 100 may provide user 112B a way to verify the transaction and to initiate a fraud claim.

The transaction information is communicated through network 120. Network 120 may facilitate communication amongst the components of system 100, including fraud alert module 110 and device 114. This disclosure contemplates any suitable network 120 operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Fraud alert module 110 may receive the transaction information and may determine whether the transaction is potentially fraudulent. Fraud alert module 110 may include a processor 111, a memory 115 and any other appropriate hardware and/or software to determine whether a transaction is potentially fraudulent. Processor 111 and memory 115 may be similar and/or analogous to processor 132 and memory 134. This disclosure contemplates fraud alert module 110 determining whether a transaction is potentially fraudulent in any appropriate manner. For example, fraud alert module 110 may compare the transaction information with stored transaction information 116 associated with user 112B. If, based on the comparison, the received transaction information indicates a transaction that is unusual or not characteristic of user 112B's regular transactions, fraud alert module 110 may determine that the transaction is potentially fraudulent. If fraud alert module 110 determines that a transaction is potentially fraudulent, fraud alert module 110 may communicate, through network 120, a message 140 to device 114. Message 140 may indicate the potentially fraudulent transaction.

Device 114 may be associated with user 112B. This disclosure contemplates device 114 being any appropriate device for sending and receiving communications over network 120. As an example and not by way of limitation, device 114 may be a computer, a laptop, a wireless or cellular telephone, an electronic notebook, a personal digital assistant, a tablet, or any other device capable of receiving, processing, storing, and/or communicating information with other components of system 100. Device 114 may also include a user interface, such as a display, a microphone, keypad, or other appropriate terminal equipment usable by user 112B. In particular embodiments, device 114 may be configured to capture images. In some embodiments, an application executed by device 114 may perform the functions described herein.

Device 114 may include a processor 132, a memory 134, a camera 136, input 138 and a display 139. This disclosure contemplates device 114 using one or more of these components to perform the functions and features described herein. For example, processor 132 may execute software stored on memory 134 to perform these functions.

Memory 134 may store information associated with user 112B. Memory 134 may store user account information 135 associated with user 112B. User account information 135 may include one or more usernames, password, credit card numbers, expiration dates, and/or any other appropriate information associated with a user account. Memory 134 may also store software 137 executable by processor 132. Software 137 may include instructions executable by processor 132 to perform any function described herein. For example, software 137 may be executed by processor 132 to initiate a fraud claim.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 134, a disk, a CD, or a flash drive. In particular embodiments, the software may include an application executable by processor 132 to perform one or more of the functions described herein.

Processor 132 may be communicatively coupled to memory 134. Processor 132 may execute software stored on memory 134 to perform any of the functions described herein. Processor 132 may control the operation and administration of device 114 by processing information received from network 120 and memory 134. For example, processor 132 may receive message 140, photographs from camera 136, and input from input 138. Processor 132 may further present information, such as messages and questions, on display 139. For example, processor 132 may present a message indicating that a potentially fraudulent transaction has occurred. As another example, processor 132 may present questions associated with a fraudulent transaction such as "Is your card still in your possession?" Processor 132 may include any hardware and/or software that operates to control and process information. Processor 132 may be a programmable logic device, a microcontroller, a microprocessor, any suitable processing device, or any suitable combination of the preceding.

Camera 136 may be communicatively coupled to processor 132. In particular embodiments, device 114 may use camera 136 to take photographs. For example, user 112B may use camera 136 to take a photograph of a police report. The police report may then be submitted and/or communicated to help resolve a claim regarding fraudulent activity. This disclosure contemplates camera 136 including any appropriate hardware and/or software to take photographs.

Input 138 may be communicatively coupled to processor 132. Input 138 may be used to receive any appropriate user input. For example, user 112B may use input 138 to confirm that a potentially fraudulent transaction was fraudulent. As another example, user 112B may use input 138 to answer a series of questions regarding the transaction. Input 138 may include buttons, switches, touch screens, microphones, track balls and/or track pads. This disclosure contemplates input 138 including any appropriate hardware and/or software to receive user input.

Display 139 may be communicatively coupled to processor 132. Display 139 may be used to present images and/or messages. For example, display 139 may present message 140, a series of questions, and a confirmation message to user 112B. This disclosure contemplates display 139 including any appropriate hardware and/or software to present images and/or messages.

System 100 may be used to communicate alerts of fraud and to initiate claims regarding fraudulent activity. In operation, when user 112A attempts a transaction using stolen information, fraud alert module 110 may detect the potentially fraudulent transaction. For example, fraud alert module 110 may compare the transaction information with stored transaction information associated with user 112B. Fraud alert module 110 may determine, based on the comparison, that the transaction is occurring at a location where user 112B does not typically conduct transactions or that the transaction involves a dollar amount that is higher than transactions previously made by user 112B. In response, fraud alert module 110 may communicate a message 140 to device 114 associated with user 112B. Message 140 may alert user 112B of the potentially fraudulent transaction. For example, message 140 may contain information associated with the potentially fraudulent transaction such as the name of a store and a dollar value. Device 114 may present message 140 on display 139.

User 112B may use device 114 to confirm that the transaction is fraudulent. User 112B may use input 138 to indicate whether the transaction is fraudulent or not. As an example, message 140 may include a request for user 112B to confirm whether the potentially fraudulent transaction is fraudulent. When user 112B sees message 140 presented on display 139, user 112B may press a button or touch a portion of a touch screen to indicate that the transaction is fraudulent.

User 112B may use device 114 to initiate a fraud claim. The fraud claim may involve filing a report. User 112B may use input 138 to prompt the filing of a report. As an example, after user 112B indicates that the transaction is fraudulent, device 114 may present another message to determine whether user 112B wants to file a report associated with the fraudulent transaction. User 112B may press a button or touch a portion of a touch screen to indicate that the report should be filed. After user 112B indicates that the report should be filed, device 114 may begin the report filing process.

As part of the report filing process, device 114 may present on display 139 one or more questions for user 112B to answer regarding the report. For example, device 114 may present the question "is your card still in your possession?" User 112B may then use input 138 to respond to the one or more questions. In this manner, device 114 may generate an appropriate report based on user 112B's responses. As another part of the report filing process, device 114 may allow user 112B to sign an affidavit associated with the report. For example, device 114 may present an interface that requests user 112B to swear or affirm that the transaction is fraudulent or that user 112B will assist with any necessary investigation associated with the transaction. Device 114 may present the affidavit on display 139. User 112B may use input 138 to electronically sign the affidavit. Device 114 may present a confirmation message on display 139 after the report has been filed. For example, device 114 may present a message on display 139 that says, "Your report has been filed."

In particular embodiments, device 114 may allow user 112E to make a telephone call. For example, after device 114 receives message 140, device 114 may present an option for user 112B to call support regarding the potentially fraudulent transaction. During the call, user 112B may gather additional information regarding the transaction that may help user 112B determine whether a report should be filed.

Device 114 may allow user 112B to submit a police report associated with the potentially fraudulent transaction. User 112B may use input 138 to indicate to device 114 that user 112B will file a police report. After the police report is filed, user 112B may use camera 136 to take a picture of the police report. Device 114 may then communicate the picture. In particular embodiments, device 114 may receive a request for the police report, and user 112B may take the picture and device 114 may communicate the picture in response to the request. In this manner, user 112B may send the police report to help resolve the fraud claim.

After the report has been filed, device 114 may receive alerts associated with the report. In particular embodiments, the alert may be a push notification. Device 114 may then present the alert on display 139. For example, device 114 may receive an alert that indicates that the report has been received, processed and/or resolved. As another example, device 114 may receive an alert that indicates the report is incomplete or requires more information. When user 112B sees the alert, user 112B may use device 114 to view the outcome of any investigation associated with the report or to supply additional information for the report.

Additionally, user 112B may use device 114 to check a balance associated with the user's account and to deposit a check into the user's account. For example, user 112B may use input 138 to indicate that user 112B wants to check the balance. In response, device 114 may present the balance on display 139. As another example, user 112B may use input 138 to indicate that user 112B wants to deposit a check. User 112B may then use camera 136 to take a picture of the check. Device 114 may then communicate the picture to the appropriate institution to deposit the check.

In particular embodiments, system 100 may reduce network traffic associated with initiating a claim regarding fraudulent activity. For example, system 100 may provide user 112B a streamlined process for initiating a claim regarding fraudulent activity, thereby reducing the amount of network traffic produced by user 112B, for example, by needlessly checking for potentially fraudulent transactions or by submitting information associated with the transaction to different institutions. In certain embodiments, system 100 may improve fraud prevention. For example, system 100 may prevent user 112A from using the stolen information multiple times.

FIGS. 2 through 7 illustrate device 114 initiating a fraud claim. In particular embodiments, using device 114 to initiate a claim regarding fraudulent activity may reduce network traffic associated with such claims and may improve fraud prevention.

Figure 2:
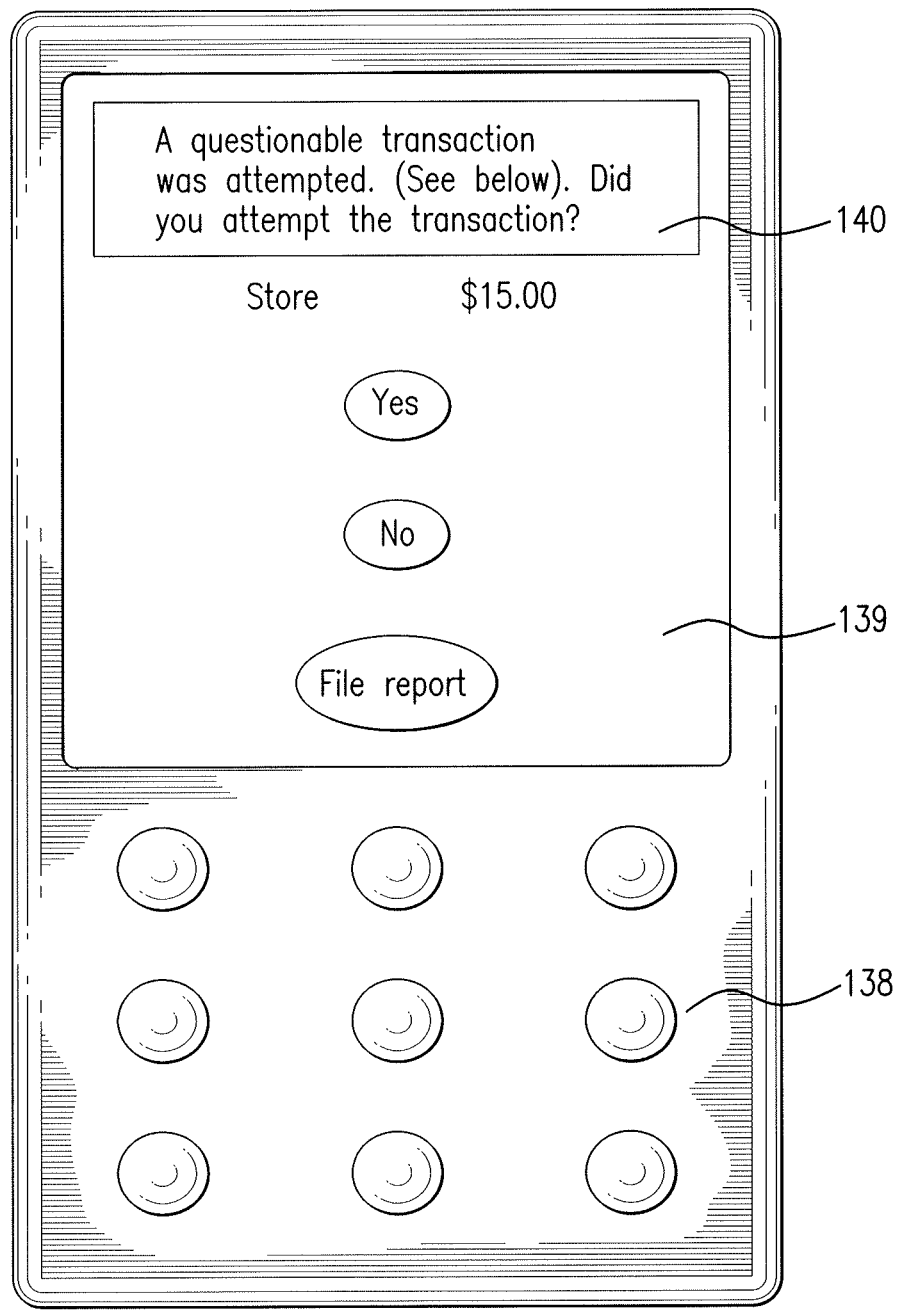
FIG. 2 is an illustration of an interface of a device of the system of FIG. 1.

FIG. 2 is an illustration of a device 114 of the system 100 of FIG. 1. As shown, device 114 includes input 138 and display 139. Device 114 may present a message 140 on display 139. This disclosure contemplates device 114 displaying any appropriate message 140 on display 139.

Device 114 may present message 140 on display 139 in response to receiving message 140. Message 140 may indicate that a questionable transaction has occurred. For example, message 140 may read "a questionable transaction was attempted. (See below). Did you attempt this transaction?" This disclosure contemplates message 140 being any appropriate message to indicate a potentially fraudulent transaction has occurred.

Device 114 may also present additional information to user 112B. For example, device 114 may present on display 139 the name of the store at which the transaction was attempted. As another example, device 114 may present a monetary value associated with the transaction. In the example illustrated in FIG. 2, device 114 is presenting the name of the store and a fifteen dollar value associated with the transaction. In this manner, user 112E may be presented with information to help determine whether the transaction is fraudulent.

User 112B may also use device 114 to indicate whether the transaction is fraudulent. User 112B may use input 138 to indicate whether the transaction is fraudulent. In the illustrated example of FIG. 2, device 114 presents on display 139 the two options "Yes" and "No". User 112B may use input 138 to select "Yes" if the transaction is fraudulent and "No" if the transaction is not fraudulent.

Furthermore, device 114 may present on display 139 an option to file a report. User 112B may use input 138 to select the option to file a report. If user 112B indicates that a report should be filed, device 114 may continue to generate the report. In particular embodiments, device 114 may present the option to file a report in response to user 112B indicating that the transaction is fraudulent. The report serves as part of the claim regarding fraudulent activity in certain embodiments.

Figure 3:
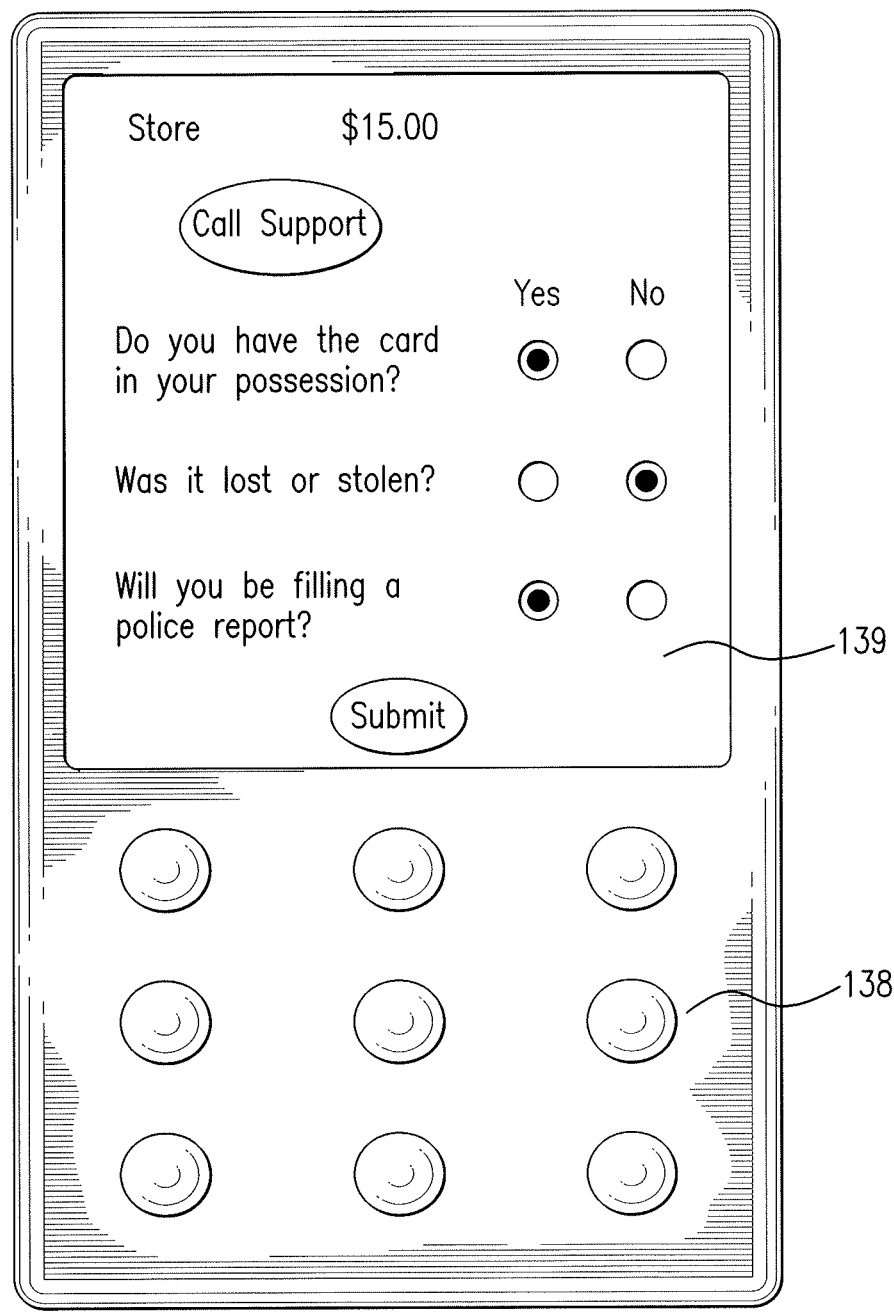
FIG. 3 is an illustration of an interface of a device of the system of FIG. 1.

FIG. 3 is an illustration of a device 114 of the system 100 of FIG. 1. As illustrated in FIG. 3, device 114 may present on display 139 one or more questions associated with the transaction. Device 114 may use the responses to these questions to generate a report. In particular embodiments, device 114 may present the one or more questions in response to user 112B indicating that a report should be filed.

In the illustrated example of FIG. 3, device 114 is presenting the questions "Do you have the card in your possession?", "Was it lost or stolen?" and "Will you be filing a police report?" As indicated on display 139, user 112B has responded that the card is in user 112B's possession, that it was not lost or stolen, and that user 112B will be filing a police report. User 112B may have provided these responses using input 138. In particular embodiments, device 114 may use these responses to generate a report. This disclosure contemplates device 114 presenting any appropriate question associated with the report and user 112B supplying any appropriate response.

Device 114 may provide user 112B an option to make a telephone call. In the illustrated example of FIG. 3, device 114 presents on display 139 an option labeled "call support." User 112B may select the option to initiate a telephone call with support regarding the transaction. In this manner, user 112B may gather more information associated with the transaction and/or resolve the transaction. This disclosure contemplates device 114 presenting the option to make a telephone call at any appropriate time.

Figure 4:
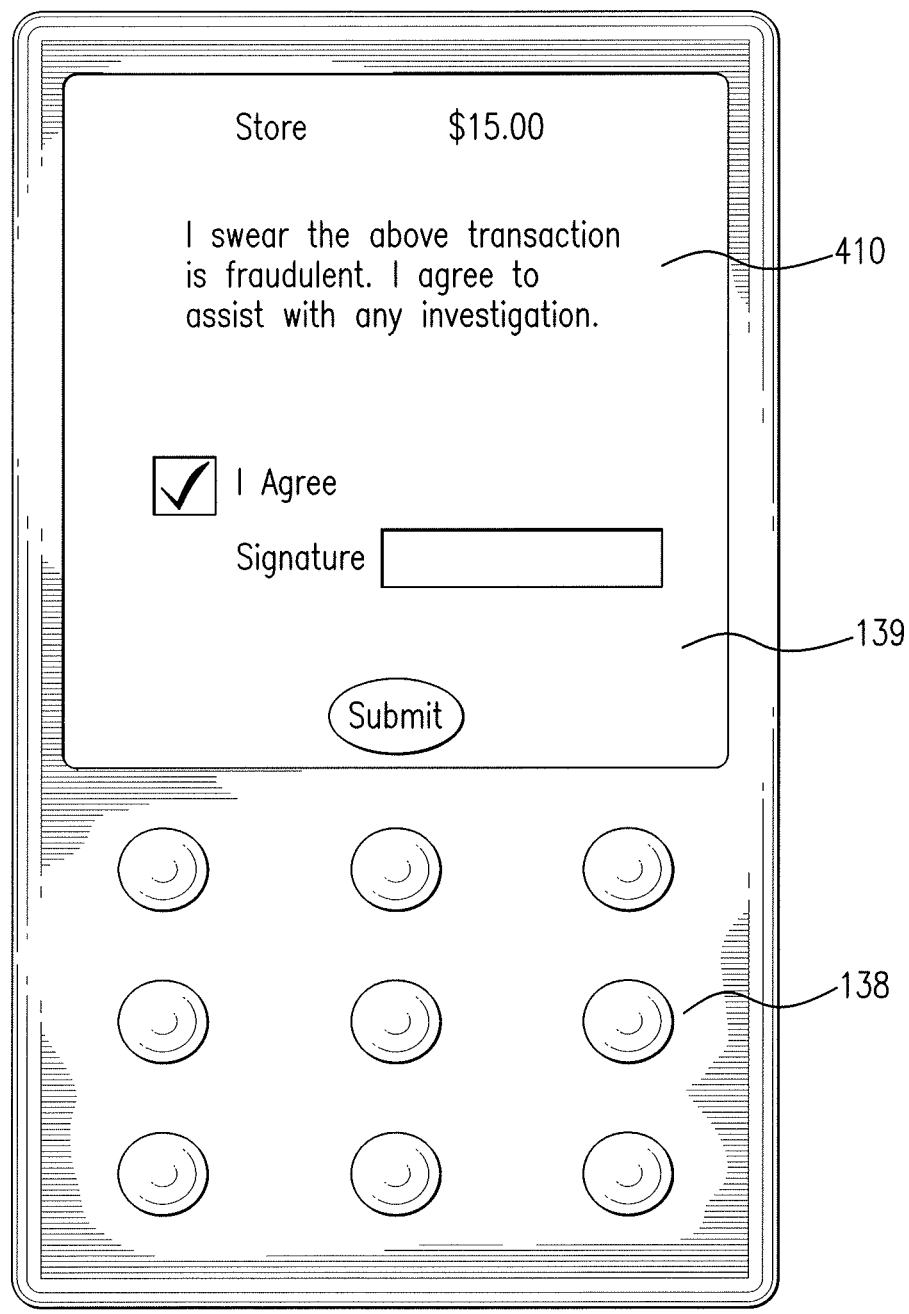
FIG. 4 is an illustration of an interface of a device of the system of FIG. 1.

FIG. 4 is an illustration of a device 114 of the system 100 of FIG. 1. As shown in FIG. 4, device 114 may present on display 139 an affidavit 410. Affidavit 410 may ask user 112B to swear or affirm that the transaction is fraudulent and/or that user 112B will assist with any investigation associated with the transaction. In particular embodiments, device 114 may present affidavit 410 in response to receiving the responses to the one or more questions. User 112B may use input 138 to electronically sign and/or execute the affidavit. As shown in FIG. 4, device 114 may provide a check box and/or a text box through which user 112B may sign and/or execute affidavit 410.

Figure 5:
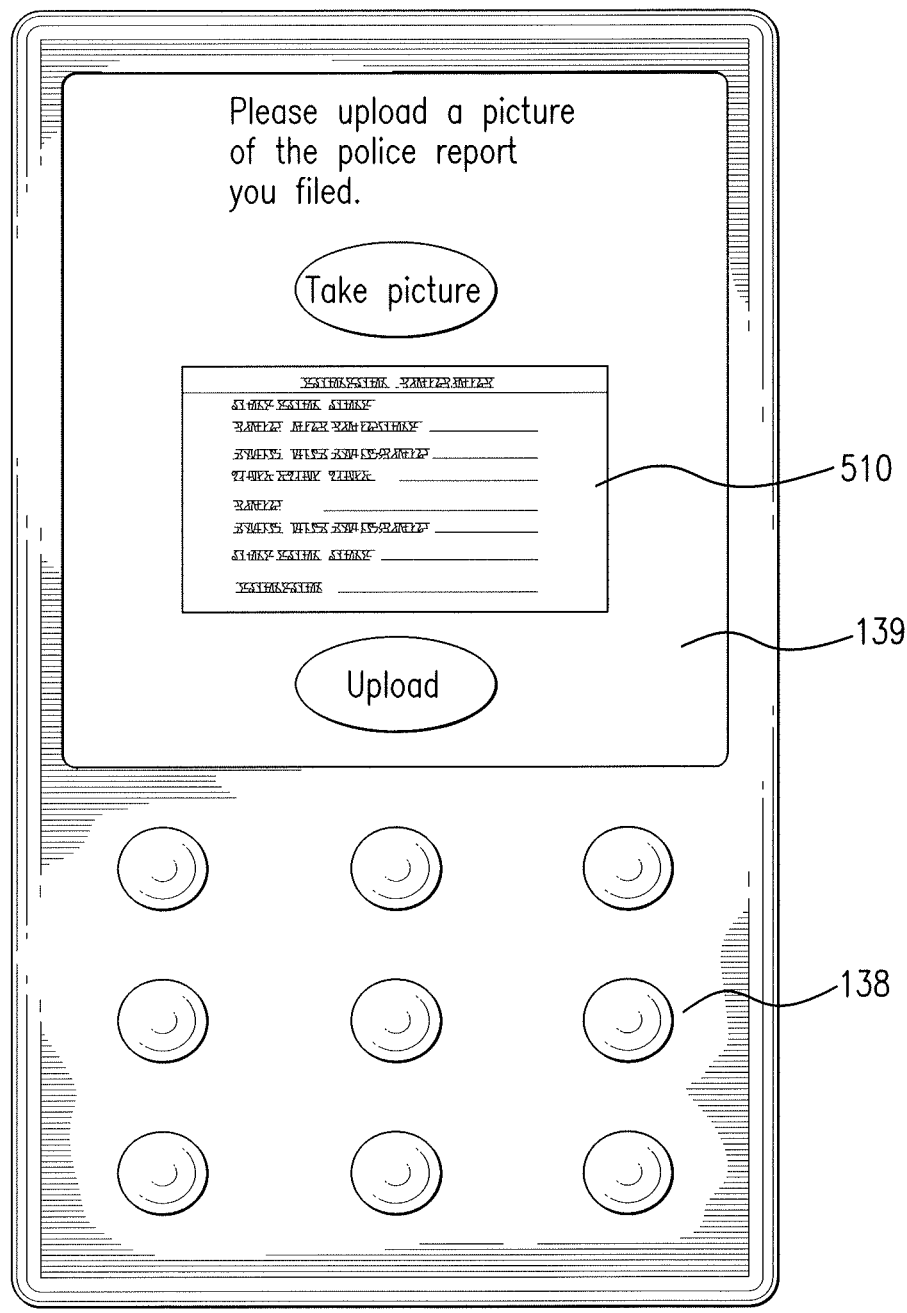
FIG. 5 is an illustration of an interface of a device of the system of FIG. 1.

FIG. 5 is an illustration of a device 114 of the system 100 of FIG. 1. As shown in FIG. 5, device 114 may allow user 112B to upload an image. In the illustrated example of FIG. 5, user 112B is using device 114 to upload a picture of a police report 510. In particular embodiments, user 112E may use camera 136 to take a picture to upload. For example, user 112B may use camera 136 to take a picture of police report 510 and then upload the picture of police report 510. Uploading the picture of police report 510 may help to resolve the claim regarding fraudulent activity. In particular embodiments, police report 510 may have been filed with the police separately by user 112B.

Figure 6:
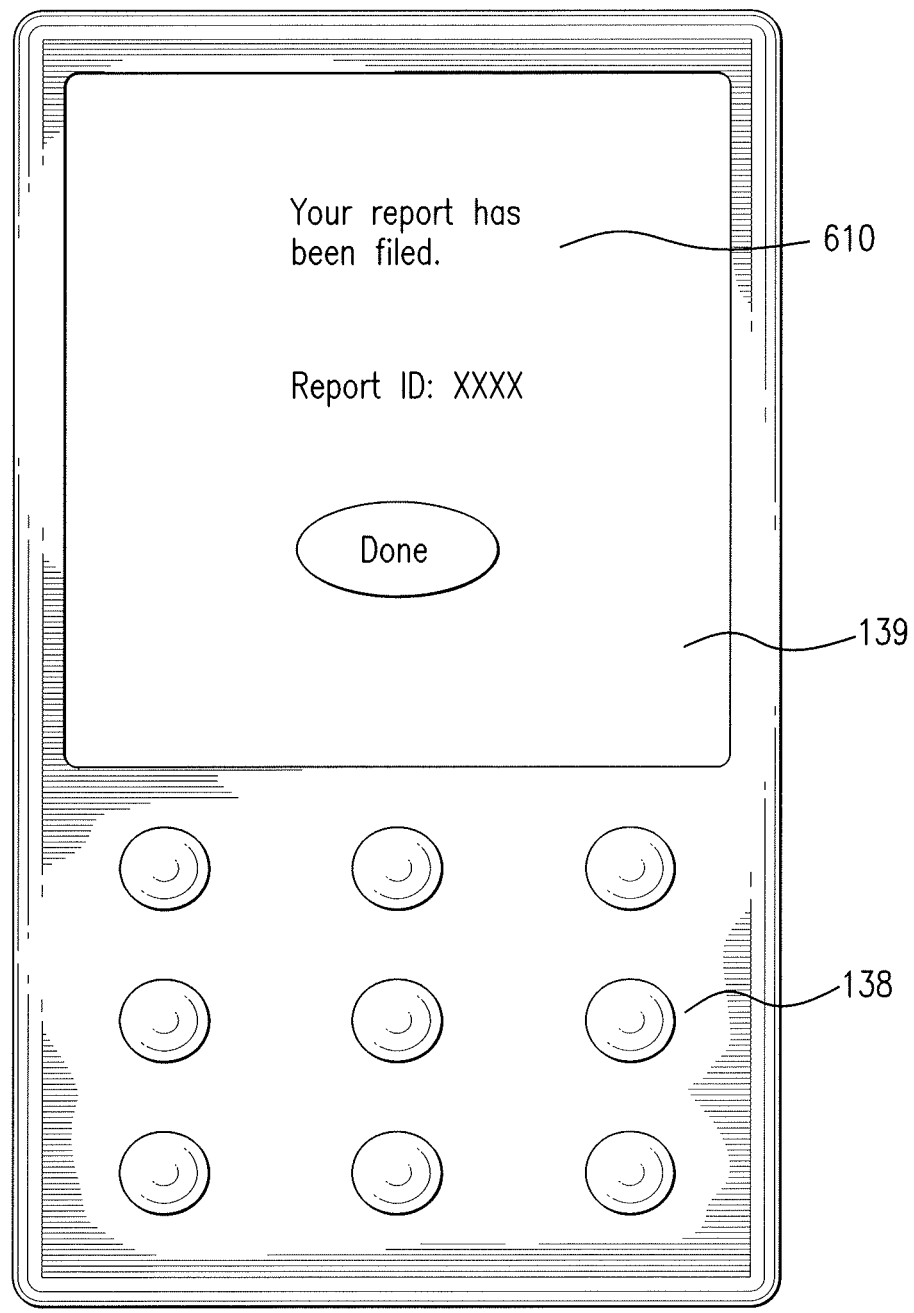
FIG. 6 is an illustration of an interface of a device of the system of FIG. 1.

FIG. 6 is an illustration of a device 114 of the system 100 of FIG. 1. As shown in FIG. 6, device 114 may present on display 139 a confirmation message 610 indicating that a report has been filed. In particular embodiments, device 114 may present confirmation message 610 in response to receiving an indication that affidavit 410 has been electronically signed and/or executed. Confirmation message 610 tells user 112B that the claim regarding fraudulent activity has been initiated and/or that the report has been filed.

Figure 7:
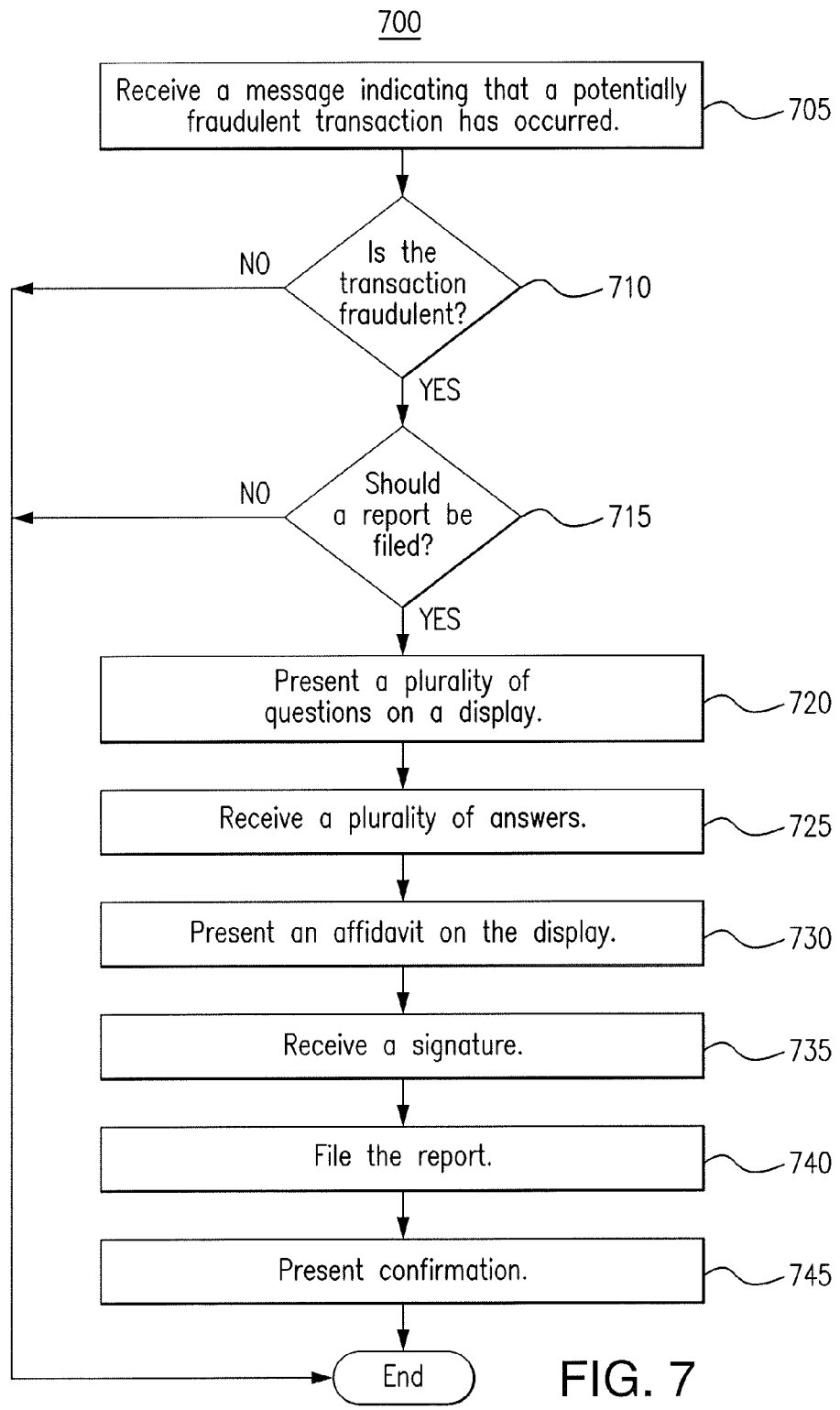
FIG. 7 is a flowchart illustrating a method using the system of FIG. 1.

FIG. 7 is a flow chart illustrating a method 700 using the system 100 of FIG. 1. Device 114 may perform method 700. In particular embodiments, performing method 700 may reduce the network traffic associated with claims regarding fraudulent activity and/or improve fraud prevention.

Device 114 may begin by receiving a message indicating that a potentially fraudulent transaction has occurred in step 705. Device 114 may present the message on a display to alert a user about the transaction. In step 710, device 114 may determine whether the transaction is fraudulent. In particular embodiments, device 114 may make this determination based on input from the user. For example, the user may press a button or touch a portion of a touch screen to indicate whether the transaction is fraudulent or not. If device 114 determines that the transaction is not fraudulent, method 700 ends. If device 114 determines that the transaction is fraudulent, device 114 may continue to step 715 to determine whether a report should be filed. In particular embodiments, device 114 may determine whether a report should be filed based on input from a user. If device 114 determines that the report should not be filed, method 700 ends.

If device 114 determines that a report should be filed, device 114 may present a plurality of questions on a display in step 720. The user may provide answers to these questions and device 114 may use these answers to generate the report. In step 725, device 114 may receive a plurality of answers to the questions. Device 114 may then continue to present an affidavit on the display in step 730. The user may sign and/or execute the affidavit and device 114 may receive the signature in step 735. In response to receiving the answers and the signature, device 114 may generate and file the report in step 740. After the report is filed, device 114 may present a confirmation message in step 745.

Although the present disclosure includes several embodiments, changes, substitutions, variations, alterations, transformations, and modifications may be suggested to one skilled in the art, and it is intended that the present disclosure encompass such changes, substitutions, variations, alterations, transformations, and modifications as fall within the spirit and scope of the appended claims.

What is claimed is:

1. An apparatus, comprising:
    a memory operable to store information associated with a user account; and
    a processor communicatively coupled to the memory and operable to:
        receive a message indicating that a transaction associated with a card has occurred;
        in response to the message, receive a first input indicating that the transaction is fraudulent;
        receive a second input indicating that a report should be filed;
        in response to receiving the second input, present, on a display, a plurality of questions to determine whether the card has been stolen;
        receive a third input indicating an answer to each of the plurality of questions;
        in response to receiving the third input, present, on the display, an affidavit;
        receive a fourth input indicating the affidavit has been electronically signed; and
        in response to receiving the fourth input, present, on the display, a confirmation message indicating that the report has been filed;
        determine a balance associated with the user account; and
        facilitate depositing a check associated with the user account.

2. The apparatus of claim 1, wherein the processor is further operable to receive a fifth input indicating a telephone call associated with the transaction should be made.

3. The apparatus of claim 1, wherein the plurality of questions comprises:
    a first question to determine whether a user associated with the user account possesses a card associated with the user account and the transaction;
    a second question to determine whether the card was lost or stolen; and
    a third question to determine whether the user will file a police report.

4. The apparatus of claim 1, wherein the processor is further operable to:

receive a request for a police report associated with the transaction;
take, using a camera, a picture of the police report; and
communicate the picture in response to the request for the police report.

5. The apparatus of claim 1, wherein the processor is further operable to receive an alert indicating that the report has been resolved.

6. The apparatus of claim 5, wherein the alert is a push notification.

7. A method comprising:
storing, by a memory, information associated with a user account;
receiving, by a processor, a message indicating that a transaction associated with a card has occurred;
in response to the message, receiving a first input indicating that the transaction is fraudulent;
receiving a second input indicating that a report should be filed;
in response to receiving the second input, presenting, on a display, a plurality of questions to determine whether the card has been stolen;
receiving a third input indicating an answer to each of the plurality of questions;
in response to receiving the third input, presenting, on the display, an affidavit;
receiving a fourth input indicating the affidavit has been electronically signed; and
in response to receiving the fourth input, presenting, on the display, a confirmation message indicating that the report has been filed;
determining a balance associated with the user account; and
facilitating depositing a check associated with the user account.

8. The method of claim 7, further comprising receiving a fifth input indicating a telephone call associated with the transaction should be made.

9. The method of claim 7, wherein the plurality of questions comprises:
a first question to determine whether a user associated with the user account possesses a card associated with the user account and the transaction;
a second question to determine whether the card was lost or stolen; and
a third question to determine whether the user will file a police report.

10. The method of claim 7, further comprising:
receiving, a request for a police report associated with the transaction;
taking, using a camera, a picture of the police report; and
communicating the picture in response to the request for the police report.

11. The method of claim 7, further comprising receiving an alert indicating that the report has been resolved.

12. The method of claim 11, wherein the alert is a push notification.

13. One or more computer-readable non-transitory storage media embodying software that is operable when executed to:
store, by a memory, information associated with a user account;
receive a message indicating that a transaction associated with a card has occurred;
in response to the message, receive a first input indicating that the transaction is fraudulent;
receive a second input indicating that a report should be filed;
in response to receiving the second input, present, on a display, a plurality of questions to determine whether the card has been stolen;
receive a third input indicating an answer to each to the plurality of questions;
in response to receiving the third input, present, on the display, an affidavit;
receive a fourth input indicating the affidavit has been electronically signed; and
in response to receiving the fourth input, present, on the display, a confirmation message indicating that the report has been filed;
determine a balance associated with the user account; and
facilitate depositing a check associated with the user account.

14. The media of claim 13, embodying software that is further operable when executed to receive a fifth input indicating a telephone call associated with the transaction should be made.

15. The media of claim 13, wherein the plurality of questions comprises:
a first question to determine whether a user associated with the user account possesses a card associated with the user account and the transaction;
a second question to determine whether the card was lost or stolen; and
a third question to determine whether the user will file a police report.

16. The media of claim 13, embodying software that is further operable when executed to:
receive a request to provide a police report associated with the transaction;
take, using a camera, a picture of the police report; and
communicate the picture in response to a request for the picture.

17. The media of claim 13, embodying software that is further operable when executed to receive an alert indicating that the report has been resolved.

18. The media of claim 17, wherein the alert is a push notification.

\* \* \* \* \*